United States Patent
Li et al.

(10) Patent No.: US 11,709,729 B2
(45) Date of Patent: Jul. 25, 2023

(54) PERFORMING ERROR CHECKING OPERATIONS ON ENCRYPTED WRITE DATA IN A MEMORY SUB-SYSTEM

(71) Applicant: Micron Technology, Inc., Boise, ID (US)

(72) Inventors: Juane Li, Milpitas, CA (US); Fangfang Zhu, San Jose, CA (US); Jiangli Zhu, San Jose, CA (US); Ying Tai, Mountain View, CA (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 17/489,409

(22) Filed: Sep. 29, 2021

(65) Prior Publication Data

US 2022/0100603 A1 Mar. 31, 2022

Related U.S. Application Data (60) Provisional application No. 63/085,667, filed on Sep. 30, 2020.

(51) Int. Cl.
  *G06F 11/10* (2006.01)
  *G06F 21/60* (2013.01)
  *G06F 3/06* (2006.01)

(52) U.S. Cl.
  CPC ........ *G06F 11/1004* (2013.01); *G06F 3/0619* (2013.01); *G06F 3/0656* (2013.01); *G06F 3/0673* (2013.01); *G06F 11/1068* (2013.01); *G06F 21/602* (2013.01)

(58) Field of Classification Search
  CPC .... G06F 3/0619; G06F 3/0673; G06F 3/0656; G06F 21/64; G06F 21/602; G06F 11/1068; G06F 11/1004
  See application file for complete search history.

(56) References Cited

U.S. PATENT DOCUMENTS

| 2014/0040639 A1* | 2/2014 | Raam ................. G06F 21/78 713/193 |
| 2014/0173238 A1* | 6/2014 | Ware ................. H04L 9/065 711/163 |
| 2016/0085692 A1* | 3/2016 | Kwok ................. G06F 21/79 713/193 |

* cited by examiner

*Primary Examiner* — Shelly A Chase
(74) *Attorney, Agent, or Firm* — Lowenstein Sandler LLP (57) ABSTRACT

System and methods are disclosed including a plurality of memory devices and a processing device, operatively coupled with the plurality of memory devices, to perform operations comprising: receiving, from a host system, encrypted write data appended with error-checking data; determining whether the encrypted write data contains an error based on the error-checking data; and responsive to determining that the encrypted write data contains an error, notifying the host system that the encrypted write data contains an error.

14 Claims, 5 Drawing Sheets

PERFORMING ERROR CHECKING OPERATIONS ON ENCRYPTED WRITE DATA IN A MEMORY SUB-SYSTEM

RELATED APPLICATION

This application claims the benefit of U.S. Provisional Application No. 63/085,667, filed Sep. 30, 2020, the entire content of which is hereby incorporated by reference.

TECHNICAL FIELD

Embodiments of the disclosure relate generally to memory sub-systems, and more specifically, relate to performing error checking operations on encrypted write data in a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Aspects of the present disclosure are directed to performing error checking operations on encrypted write data in a memory sub-system. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a negative-and (NAND) memory device. Another example is a three-dimensional cross-point ("3D cross-point") memory device, which is a cross-point array of non-volatile memory cells. Other examples of non-volatile memory devices are described below in conjunction with FIG. 1. A non-volatile memory device is a package of one or more dies. Each die can consist of one or more planes. For some types of non-volatile memory devices (e.g., NAND devices), each plane consists of a set of physical blocks. Each block consists of a set of pages. Each page consists of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values. The non-volatile memory devices can include three-dimensional cross-point ("3D cross-point") memory devices that are a cross-point array of non-volatile memory cells and can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased.

In conventional memory sub-systems, a host system can issue a write data request (i.e., a program request) and/or a read data request to a memory sub-system. The write data request can include write data to be stored on the memory sub-system. The host system can append the write data with a cyclic redundancy check (CRC) code, and then encrypt the appended message data using, for example, Advanced Encryption Standard (AES) encryption. The memory sub-system can receive the encrypted write data appended with the CRC code from the host system, modify the encrypted write data in various ways, (e.g., such as encode the encrypted write data using error-correcting code (ECC)), compress the encrypted write data and/or append metadata to the encrypted write data), and store the encrypted write data to one or more memory devices.

Later, the host system can send a request to the memory sub-system to access the stored encrypted data. In response, the memory sub-system can retrieve the encrypted data and provide the encrypted data to the host system. The host system can decrypt the retrieved data, and then use the appended CRC code to check whether the retrieved data is corrupted or contains an error. For example, the host system can generate a new CRC code from the retrieved data and can compare the new CRC code with the original CRC code. If the two CRC codes match, then the host system can determine that the retrieved data is valid (e.g., same as the original write data requested to be stored). On the other hand, if the two CRC codes do not match, then the host system can determine that the retrieved data is corrupted. Accordingly, the CRC check is performed on an end-to-end basis by the host system.

In conventional memory sub-systems, there is no mechanism to check whether an error has been introduced to the encrypted write data along the write data path (e.g., the path from the host system generating write data to the memory sub-system storing the encrypted write data). For example, an error can be introduced during transmission of the encrypted write data from the host system to the memory sub-system. This is because the write data is encrypted by the host system, and a CRC check cannot be performed by the memory sub-system because the memory sub-system cannot decrypt the encrypted write data to access the appended CRC code. In order to check for such an error, the host system must first receive and decode the retrieved data to check for any errors. As such, in conventional systems, the host system will not know if an error had been introduced along the write data path until the host system issues a read data request. At this point, however, the message data may be corrupted and unrecoverable.

Aspects of the present disclosure address the above and other deficiencies by enabling a memory sub-system that performs error-checking operations (e.g., a CRC operation) upon receiving, from the host system, encrypted write data appended with an error-checking data (e.g., a CRC code). According to the aspects of the present disclosure, a host system can generate write data to be stored on the memory sub-system. The host system can then append error-checking data to the write data. The error-check data can be a CRC code that the host system will check in response a future read command to receive the write data as read data. Thus, this CRC code can be referred to as an "end-to-end" CRC code. The host system can further encrypt the write data (along with the appended end-to-end CRC code). Furthermore, the host system can append additional code checking data (such as another CRC code) to the encrypted data. This second CRC code can be used, by the memory sub-system, to determine whether the received encrypted write data was corrupted during the transmission from the host system to the memory sub-system. For example, the memory sub-system can receive, from the host system, a write command including the encrypted write data, where the encrypted write data is appended with the second CRC code (referred to as write path data CRC code). The memory sub-system can then determine whether the encrypted write data contains an error based on the write path data CRC code since the write path data CRC code is not encrypted. Responsive to determining that the encrypted write data contains an error, the memory sub-system can notify the host system that the encrypted write data contains an error. The host can then resend the encrypted write data. The memory sub-system can also drop (e.g., remove from a write queue, not place in a write queue, etc.) the encrypted write data prior to storing the encrypted write data on the memory devices. Responsive to determining that the encrypted write data does not contain an error, the memory sub-system can store the encrypted write data on one or more of the memory devices.

Advantages of the present disclosure include, but are not limited to, ensuring integrity of data during storing by detecting whether an error is introduced during the transmission of said data from the host system to the memory sub-system, and performing a corrective action in response to detecting an error (e.g., notifying the host system of the error so that the host system can resend the data). The present disclosure further reduces end-to-end CRC check fails. As a result, the reliability of the memory sub-system can be improved.

Figure 1:
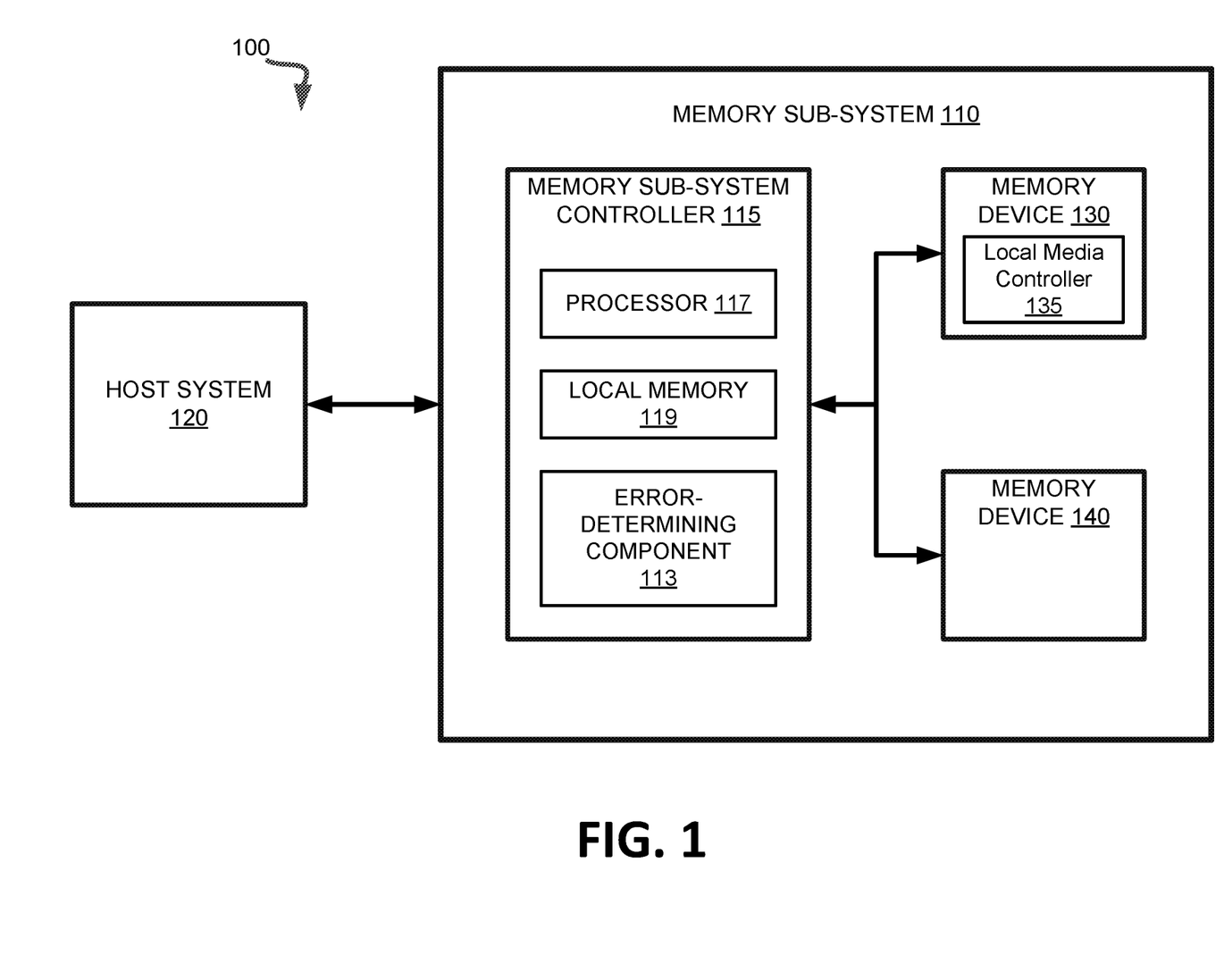
FIG. 1 illustrates an example computing system that includes a memory sub-system in accordance with some embodiments of the present disclosure.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address (PBA)) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local controller 132) on the die and a controller (e.g., memory sub-system controller 115) for media management within the same memory device package. An example of a managed memory device is a managed NAND (MNAND) device.

The memory sub-system 110 includes an error-determining component 113 that can perform error-checking operations upon receiving, from the host system 120, encrypted write data. appended with an error-checking data (e.g., a CRC code). In some embodiments, the memory sub-system controller 115 includes at least a portion of the error-determining component 113. In some embodiments, the error-determining component 113 is part of the host system 110, an application, or an operating system. In other embodiments, local media controller 135 includes at least a portion of error-determining component 113 and is configured to perform the functionality described herein.

Error-determining component 113 can implement a set of schemes to store correct and uncorrupted encrypted write data to the memory device(s) 130, 140. In an illustrative example, the host system 120 can generate write data, append the write data with an initial CRC code (hereafter "end-to-end CRC code"), encrypt the write data (e.g., using AES encryption), append the encrypted write data using another CRC code (hereafter "write path data CRC code"), and send the encrypted write data to the memory sub-system 110. The error-detecting component 113 can receive the encrypted write data from the host system 120, and determine whether the encrypted write data contains an error based on the appended write path data CRC code. For example, the error-determining component 113 can generate or receive from the host system 120 a check CRC code to compare to the received write path data CRC code to determine whether the check CRC code and the appended write path data CRC code match. If the two CRC codes match, then the error-determining component 113 can determine that the encrypted write data is valid, and store the encrypted write data on memory device 130 and/or memory device 140. If the two CRC codes do not match, then the error-determining component 113 can determine that the encrypted write data is corrupted, and notify the host system 120 of the corruption and/or request for the host 120 to resend the encrypted write data. In some embodiments, the check CRC code can be generated by the error-determining component 113 using, for example, a generator polynomial or any other algorithm capable of providing the check CRC code. In other embodiments, the host system 120 can generate the check CRC code and send the check CRC code to the error-determining component 113 prior to or after sending the encrypted write data. Similar to the error-determining component 113, the host system 120 can generate the check CRC code using, for example, a generator polynomial or any other algorithm. Accordingly, the CRC check can be performed each time the memory sub-system 110 receives encrypted write data from the host system 120. Further details with regards to the operations of the error-determining component 113 are described below.

Figure 2:
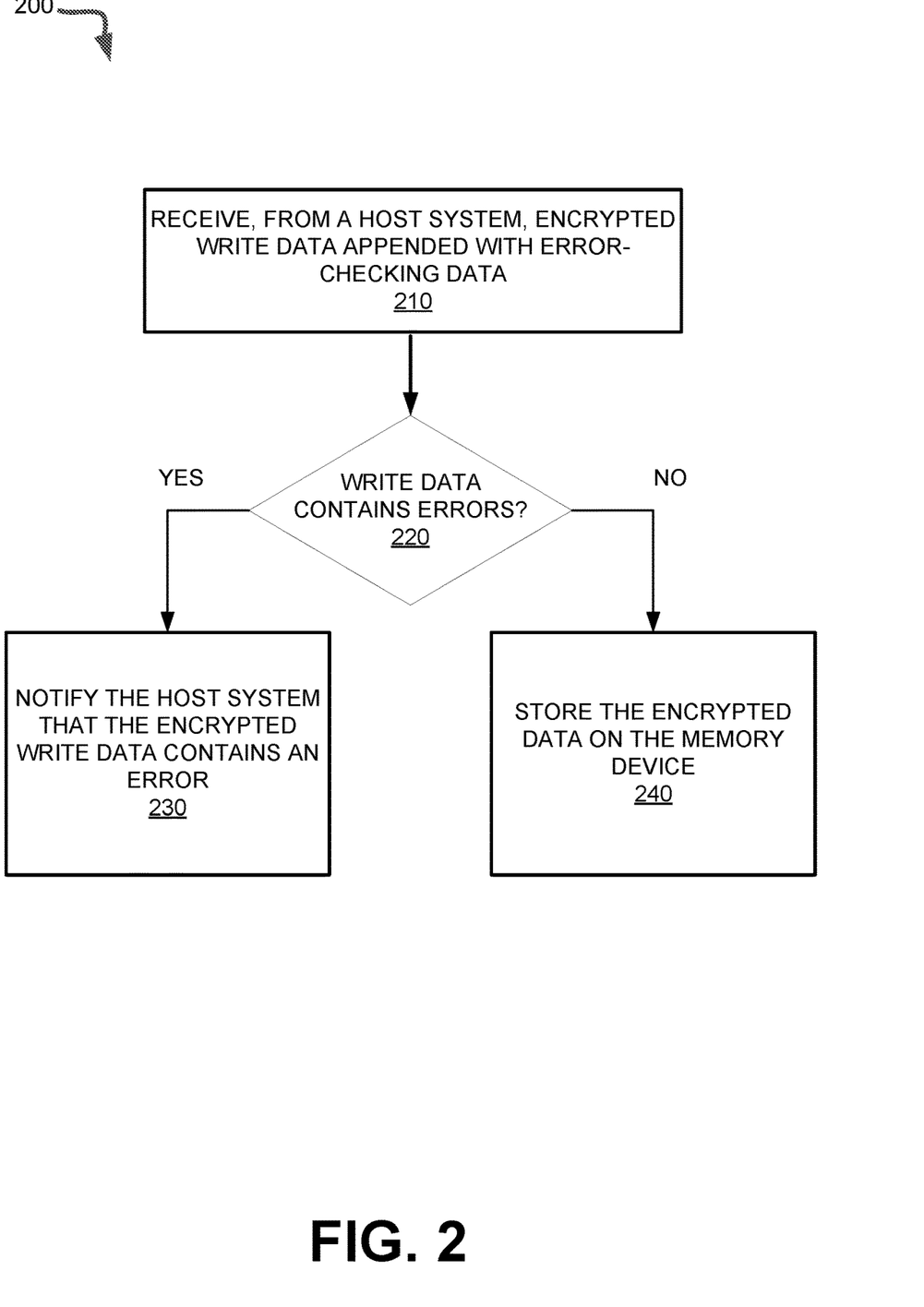
FIG. 2 is a flow diagram of an example method to detect errors in received encrypted write data in accordance with some embodiments of the present disclosure.

FIG. 2 is a flow diagram of an example method 200 to detect errors in received encrypted write data, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the error-determining component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 210, the processing logic receives, from the host system 120, encrypted write data appended with error-checking data. In some embodiments the error checking data can be based on CRC operation and include a CRC code. In other embodiments, the error checking data can include parity checks, checksums, or any other type of error-checking code. The write data can be encrypted using, for example, AES encryption, RSA (Rivest-Shamir-Adleman) encryption, 3DES (Triple Data Encryption Standard) encryption, or any other type of data encryption.

At operation 220, the processing logic can determine whether the encrypted write data contains an error based on the error-checking data. In some embodiments, the processing logic can perform an error-checking operation (e.g., a CRC operation). For example, the processing logic can generate a check CRC code to compare to the received CRC that is appended to the encrypted write data. In some embodiments, the processing logic can generate the check CRC code using, for example, a generator polynomial or any other capable algorithm. In some embodiments, the processing logic can receive the check CRC code from the host system 120 prior to or after receiving the encrypted write data. Responsive to the processing logic determining that the check CRC code and the received appended CRC code match, then the processing logic can determine that the encrypted write data is valid (e.g., the same as the original write data sent by the host system 120). On the other hand, if the check CRC code and the received appended CRC code do not match, then the processing logic can determine that the encrypted write data contains an error (e.g., contains an unintended change).

Responsive to determining that the encrypted write data contains an error, at operation 230, the processing logic can notify the host system 120 that the encrypted write data contains the error. The processing logic can further drop the encrypted write data. For example, the processing logic can abort placing the encrypted write data into a write buffer, remove the encrypted data from the write buffer, etc. The host system 120 can then resend the encrypted write data to the memory sub-system 110. Accordingly, the processing logic can perform the error-checking operation (e.g., a CRC operation) to determine whether received encrypted write data contains an error each time the memory sub-system 110 receives encrypted write data from the host system 120. The processing logic can repeat the process of operations 220 and 230 until the processing logic determines that the received encrypted write data contains no errors.

Returning to operation 220, responsive to determining that the encrypted write data does not contain an error, at operation 240, the processing logic can store the encrypted write data on the memory device (e.g., memory device 130 and/or memory device 140). In some embodiments, the processing logic can modify the encrypted write data prior to storing the encrypted write data. For example, the processing logic can encode the encrypted write data using ECC, compressing the encrypted write data, and/or appending metadata to the encrypted write data.

Figure 3:
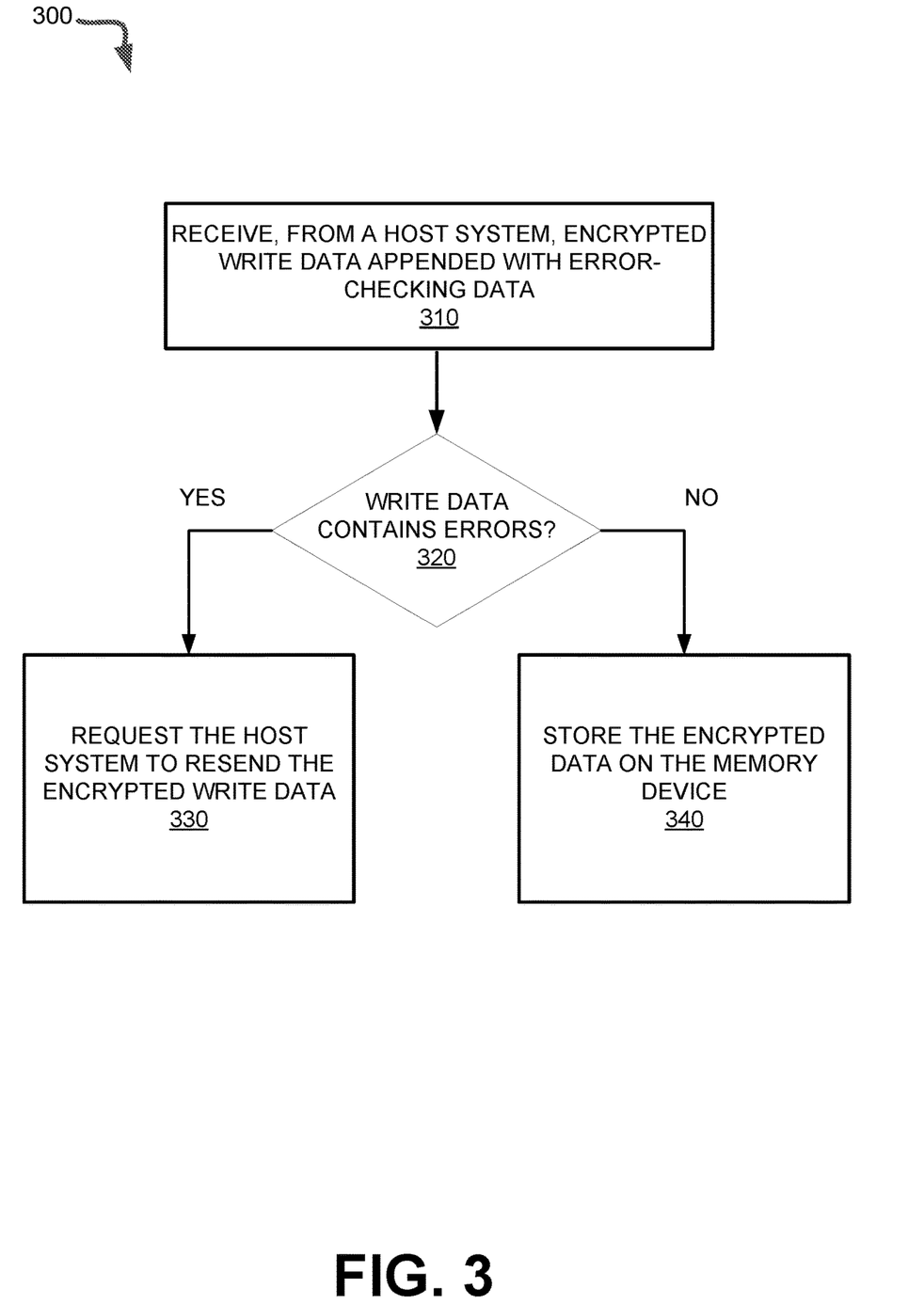
FIG. 3 is a flow diagram of another example method to detect errors in received encrypted write data in accordance with some embodiments of the present disclosure.

FIG. 3 is a flow diagram of another example method 300 to detect errors in received encrypted write data, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the error-determining component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Method 300 can include one or more operations that are similar to method 200 and can be performed in the same or a similar manner as described above in regards to method 200.

At operation 310, the processing logic can receive, from the host system, encrypted write data appended with error-checking data. The error checking data can be based on CRC operation and include a CRC code, or can include parity checks, checksums, or any other type of error-checking code. The write data can be encrypted using AES encryption, RSA encryption, 3DES, or any other type of data encryption.

At operation 320, the processing logic can determine whether the encrypted write data contains an error based on the error-checking data. In some embodiments, the processing logic can perform an error-checking operation (e.g., a CRC operation). For example, the processing logic can generate a check CRC code to compare to the received CRC that is appended to the encrypted write data. In some embodiments, the processing logic can generate the check CRC code using, for example, a generator polynomial or any other capable algorithm. In some embodiments, the processing logic can receive the check CRC code from the host system 120 prior to or after receiving the encrypted write data. Responsive to the processing logic determining that the check CRC code and the received appended CRC code match, then the processing logic can determine that the encrypted write data is valid (e.g., the same as the original write data sent by the host system 120). On the other hand, if the check CRC code and the received appended CRC code do not match, then the processing logic can determine that the encrypted write data contains an error (e.g., contains an unintended change).

Responsive to determining that the encrypted write data contains an error, at operation 330, the processing logic can request the host system to resend encrypted write data. The processing logic can further drop the encrypted write data (e.g., abort placing the encrypted write data into a write buffer, remove the encrypted data from the write buffer, etc.). Responsive to receiving the re-sent encrypted write data, the processing logic can repeat the process of operations 320 and 330 until the processing logic determines that the received encrypted write data contains no errors.

Returning to operation 320, responsive to determining that the encrypted write data does not contain an error, at operation 340, the processing logic can store the encrypted write data on the memory device (e.g., memory device 130 and/or memory device 140).

Figure 4:
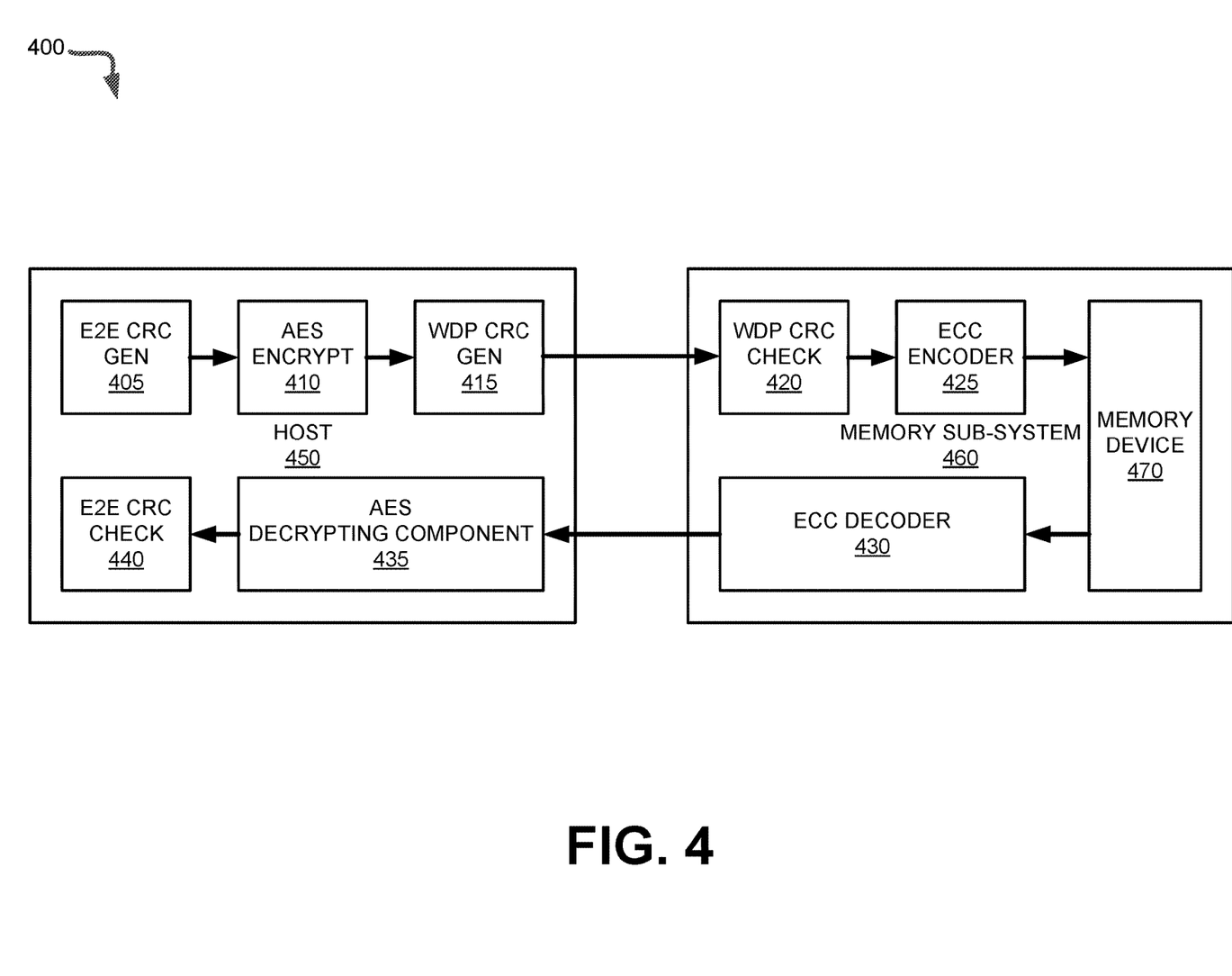
FIG. 4 is a block diagram illustrating and example computer system in which methodologies of the present disclosure are performed in accordance with some embodiments of the present disclosure.

FIG. 4 is a block diagram illustrating one or more of the methodologies discussed herein, in accordance with some embodiments of the present disclosure. FIG. 4 illustrates one example of a host system 450 coupled to one memory sub-system 460. Host system 450 can include similar components and perform similar functions as host 120. Memory sub-system 460 can include similar components and perform similar functions as memory sub-system 110. By way of illustrative example, FIG. 4 will be described as an exemplary example using CRC codes, AES encryption, and ECC encoding.

Host system 450 can include end-to-end CRC code generating component 405, AES encrypting component 410, write data path CRC code generating component 415, AES decrypting component 435, and end-to-end CRC code checking component 440. Memory sub-system 460 can include write data path CRC code-checking component 420, ECC encoder 425, ECC decoder 430, and memory 470. Memory 470 can be any combination of the different types of non-volatile memory devices and/or volatile memory devices.

The host system 450 can generate write data. End-to-end CRC code generating component 405 can then append the write data with a CRC code (hereafter "end-to-end CRC code"). The AES encrypting component 410 can then encrypt the write data with the appended end-to-end CRC code using AES an encryption procedure. Write data path CRC code generating component 415 can then append the encrypted write data with another CRC code (hereafter "write path data CRC code"), and send the encrypted write data appended with the write path data CRC code to the memory sub-system 460.

The memory sub-system 460 can receive the encrypted write data appended with the write path data CRC code from the host system 450. Write data path CRC code checking component 420 can determine whether the encrypted write data contains an error based on the appended write path data CRC code. For example, the write data path CRC code checking component 420 can generate a new CRC code from the encrypted write data and compare the new CRC code with the check CRC code. The check CRC code can be received from the host system 450, or generated by the data path CRC code checking component 420. Responsive to the CRC codes matching, the ECC encoder 425 can then, optionally, encode the encrypted data using an ECC code and store the encoded and encrypted data on memory device 470. Responsive to the CRC codes not matching, the memory sub-system 460 can notify the host system 450, or request the host system 450 to resend the encrypted data.

Responsive to receiving a read data request from the host system 450, ECC decoder 430 can decode the stored encrypted data, if necessary, and send the stored encrypted data to the host system 450. AES decrypting component 435 can then decrypt the retrieved encrypted data, and end-to-end CRC code checking component 440 can determine whether the retrieved data contains an error based on the appended end-to-end CRC code.

Figure 5:
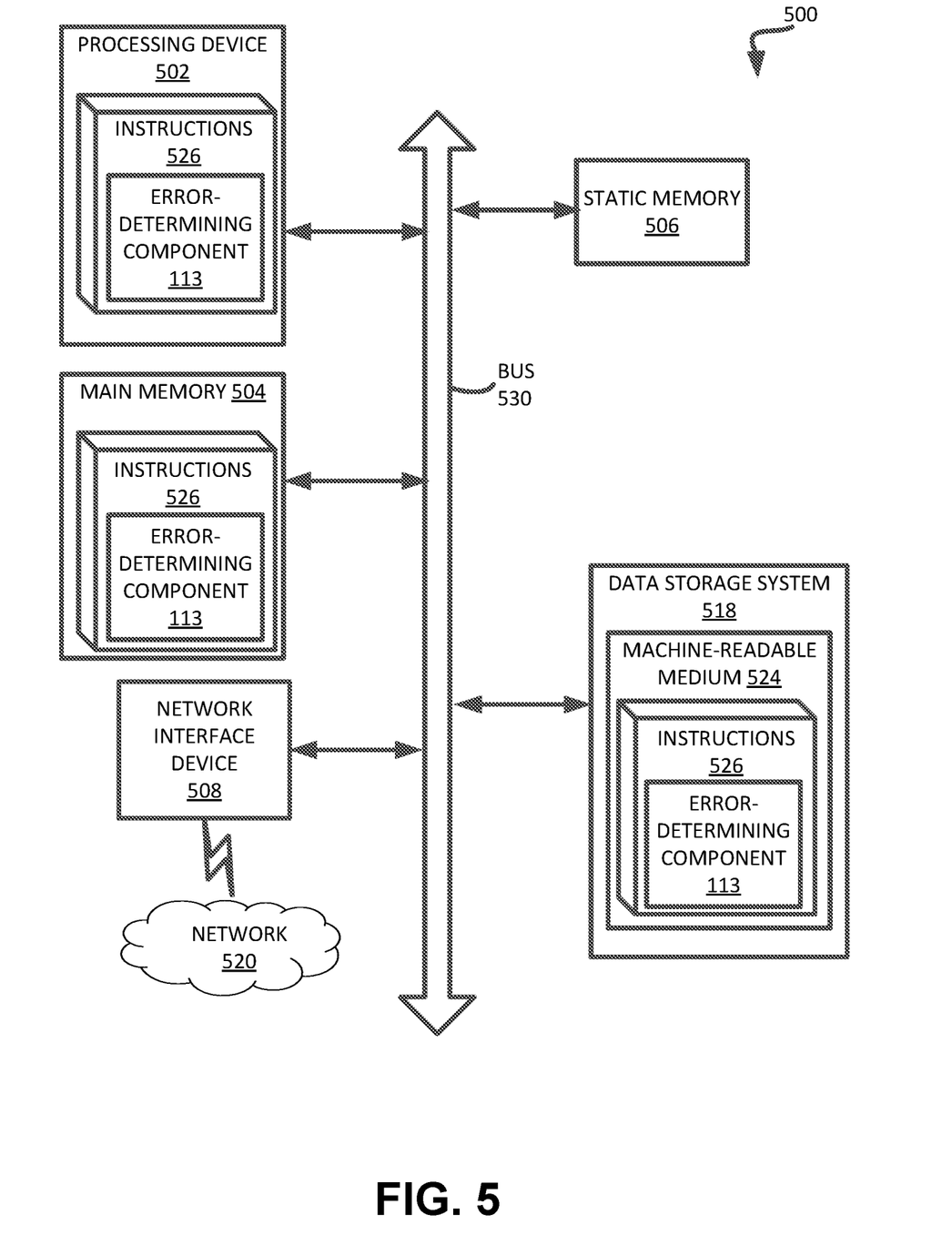
FIG. 5 is a block diagram of an example computer system in which embodiments of the present disclosure may operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the error-determining component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or RDRAM, etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to an error-determining component (e.g., the error-determining component 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:
1. A system comprising:
   a plurality of memory devices; and a processing device, operatively coupled with the plurality of memory devices, to perform operations comprising:
  receiving, from a host system, encrypted write data appended with error-checking data;
  determining whether the encrypted write data contains an error based on the error-checking data;
  responsive to determining that the encrypted write data contains an error, notifying the host system that the encrypted write data contains an error; and
  performing at least one of: aborting an operation to place the encrypted write data into a write buffer or removing the encrypted data from a write buffer.

2. The system of claim 1, wherein the encrypted write data comprises write data first appended with a cyclic redundancy check (CRC) code and then encrypted with Advanced Encryption Standard (AES) encryption.

3. The system of claim 1, wherein the error-checking data is based on a cyclic redundancy check (CRC) operation and comprises CRC code.

4. The system of claim 1, wherein determining whether the encrypted write data contains an error comprises the processing device performing further operations comprising:
  at least one of generating check error-checking data or receiving, from the host system, the check error-checking data; and
  determining whether the check error-checking data and the error-checking data appended to the encrypted write data match.

5. The system of claim 1, wherein the processing device is to perform further operations comprising:
  responsive to determining that the encrypted write data does not contain an error, storing the encrypted write data on a memory device.

6. A method, comprising:
  receiving, from a host system, encrypted write data appended with error-checking data;
  determining whether the encrypted write data contains an error based on the error-checking data;
  responsive to determining that the encrypted write data contains an error, requesting the host system to resend the encrypted write data; and
  performing at least one of: aborting an operation to place the encrypted write data into a write buffer or removing the encrypted data from a write buffer.

7. The method of claim 6, wherein the encrypted write data comprises write data first appended with a cyclic redundancy check (CRC) code and then encrypted with Advanced Encryption Standard (AES) encryption.

8. The method of claim 6, wherein the error-checking data is based on a cyclic redundancy check (CRC) operation and comprises CRC code.

9. The method of claim 6, wherein determining whether the encrypted write data contains an error comprises:
  at least one of generating check error-checking data or receiving, from the host system, the check error-checking data; and
  determining whether the check error-checking data and the error-checking data appended to the encrypted write data match.

10. The method of claim 6, further comprising:
  responsive to determining that the encrypted write data does not contain an error, storing the encrypted write data on a memory device.

11. A non-transitory computer-readable storage medium comprising instructions that, when executed by a processing device, cause the processing device to perform operations comprising:
  receiving, from a host system, encrypted write data appended with error-checking data;
  determining whether the encrypted write data contains an error based on the error-checking data;
  responsive to determining that the encrypted write data contains an error, notifying the host system that the encrypted write data contains an error; and
  performing at least one: of aborting an operation to place the encrypted write data into a write buffer or removing the encrypted data from a write buffer.

12. The non-transitory computer-readable storage medium of claim 11, wherein the encrypted write data comprises write data first appended with a cyclic redundancy check (CRC) code and then encrypted with Advanced Encryption Standard (AES) encryption.

13. The non-transitory computer-readable storage medium of claim 11, wherein the error-checking data is based on a cyclic redundancy check (CRC) operation and comprises CRC code.

14. The non-transitory computer-readable storage medium of claim 11, wherein determining whether the encrypted write data contains an error comprises the processing device performing further operations comprising:
  at least one of generating check error-checking data or receiving, from the host system, the check error-checking data; and
  determining whether the check error-checking data and the error-checking data appended to the encrypted write data match.

* * * * *